US012537308B2

(12) United States Patent
Shi

(10) Patent No.: US 12,537,308 B2
(45) Date of Patent: Jan. 27, 2026

(54) SYMMETRICAL TWO-PIECE WAVEGUIDE

(71) Applicant: Aptiv Technologies AG, Schaffhausen (CH)

(72) Inventor: Shawn Shi, Thousand Oaks, CA (US)

(73) Assignee: Aptiv Technologies AG, Schaffhausen (CH)

( * ) Notice: Subject to any disclaimer, the term of this patent is extended or adjusted under 35 U.S.C. 154(b) by 477 days.

(21) Appl. No.: 18/159,014

(22) Filed: Jan. 24, 2023

(65) Prior Publication Data

US 2024/0250441 A1 Jul. 25, 2024

(51) Int. Cl.
*H01Q 13/00* (2006.01)

(52) U.S. Cl.
CPC .................................. *H01Q 13/00* (2013.01)

(58) Field of Classification Search
CPC ...................................................... H01Q 13/00
See application file for complete search history.

(56) References Cited

U.S. PATENT DOCUMENTS 2,851,686 A 9/1958 Hagaman
3,029,432 A 4/1962 Hansen
3,032,762 A 5/1962 Kerr
3,328,800 A 6/1967 Algeo
3,462,713 A 8/1969 Knerr
3,473,162 A 10/1969 Veith
3,579,149 A 5/1971 Ramsey
3,594,806 A 7/1971 Black et al.
3,597,710 A 8/1971 Levy
3,852,689 A 12/1974 Watson
(Continued)

FOREIGN PATENT DOCUMENTS

CA 2654470 A1 12/2007
CN 1254446 A 5/2000
(Continued)

OTHER PUBLICATIONS

Xu, et al., "CPW Center-Fed Single-Layer SIW Slot Antenna Array for Automotive Radars", Jun. 12, 2014, pp. 4528-4536.
(Continued)

*Primary Examiner* — Graham P Smith
(74) *Attorney, Agent, or Firm* — Harness, Dickey & Pierce, P.L.C.

(57) ABSTRACT

A symmetrical two-piece waveguide is described herein. The waveguide comprises an upper structure that forms a first symmetrical portion of at least one channel that defines an energy path between an input portion and a radiator portion of the channel. The waveguide further comprises a lower structure that forms a second symmetrical portion of the channel that is symmetrical to the first symmetrical portion about a separation plane when the upper and lower structures are mated. The upper structure further forms the radiator portion that extends orthogonally from an upper surface of the first symmetrical portion opposite the separation plane. The lower structure further forms the input portion that extends orthogonally from a lower surface of the second symmetrical portion opposite the separation plane. By using symmetry, the disclosed waveguide leverages the benefits of a two-piece design while enabling near-lossless channeling of energy without conductive bonding.

20 Claims, 5 Drawing Sheets

(56) References Cited

U.S. PATENT DOCUMENTS 4,157,516 A 6/1979 Grijp
4,291,312 A 9/1981 Kaloi
4,453,142 A 6/1984 Murphy
4,562,416 A 12/1985 Sedivec
4,590,480 A 5/1986 Nikolayuk et al.
4,839,663 A 6/1989 Kurtz
5,030,965 A 7/1991 Park et al.
5,047,738 A 9/1991 Wong et al.
5,065,123 A 11/1991 Heckaman et al.
5,068,670 A 11/1991 Maoz
5,113,197 A 5/1992 Luh
5,337,065 A 8/1994 Bonnet et al.
5,350,499 A 9/1994 Shibaike et al.
5,541,612 A 7/1996 Josefsson
5,638,079 A 6/1997 Kastner et al.
5,923,225 A 7/1999 Santos
5,926,147 A 7/1999 Sehm et al.
5,982,256 A 11/1999 Uchimura et al.
5,986,527 A 11/1999 Ishikawa et al.
6,072,375 A 6/2000 Adkins et al.
6,166,701 A 12/2000 Park et al.
6,414,573 B1 7/2002 Swineford et al.
6,489,855 B1 12/2002 Kitamori et al.
6,535,083 B1 3/2003 Hageman et al.
6,622,370 B1 9/2003 Sherman et al.
6,788,918 B2 9/2004 Saitoh et al.
6,794,950 B2 9/2004 Toit et al.
6,859,114 B2 2/2005 Eleftheriades et al.
6,867,660 B2 3/2005 Kitamori et al.
6,958,662 B1 10/2005 Salmela et al.
6,992,541 B2 1/2006 Wright et al.
7,002,511 B1 2/2006 Ammar et al.
7,091,919 B2 8/2006 Bannon
7,142,165 B2 11/2006 Sanchez et al.
7,420,442 B1 9/2008 Forman
7,439,822 B2 10/2008 Shimura et al.
7,495,532 B2 2/2009 McKinzie, III
7,498,994 B2 3/2009 Vacanti
7,626,476 B2 12/2009 Kim et al.
7,659,799 B2 2/2010 Jun et al.
7,886,434 B1 2/2011 Forman
7,973,616 B2 7/2011 Shijo et al.
7,994,879 B2 8/2011 Kim et al.
8,013,694 B2 9/2011 Hiramatsu et al.
8,089,327 B2 1/2012 Margomenos et al.
8,159,316 B2 4/2012 Miyazato et al.
8,395,552 B2 3/2013 Geiler et al.
8,451,175 B2 5/2013 Gummalla et al.
8,451,189 B1 5/2013 Fluhler
8,576,023 B1 11/2013 Buckley et al.
8,604,990 B1 12/2013 Chen et al.
8,692,731 B2 4/2014 Lee et al.
8,717,124 B2 5/2014 Vanhille et al.
8,803,638 B2 8/2014 Kildal
8,948,562 B2 2/2015 Norris et al.
9,007,269 B2 4/2015 Lee et al.
9,203,139 B2 12/2015 Zhu et al.
9,203,155 B2 12/2015 Choi et al.
9,246,204 B1 1/2016 Kabakian
9,258,884 B2 2/2016 Saito
9,356,238 B2 5/2016 Norris et al.
9,368,878 B2 6/2016 Chen et al.
9,450,281 B2 9/2016 Kim
9,537,212 B2 1/2017 Rosen et al.
9,647,313 B2 5/2017 Marconi et al.
9,653,773 B2 5/2017 Ferrari et al.
9,653,819 B1 5/2017 Izadian
9,673,532 B2 6/2017 Cheng et al.
9,806,393 B2 10/2017 Kildal et al.
9,806,431 B1 10/2017 Izadian
9,813,042 B2 11/2017 Xue et al.
9,843,301 B1 12/2017 Rodgers et al.
9,882,288 B2 1/2018 Black et al.
9,935,065 B1 4/2018 Baheti et al.
9,991,606 B2 6/2018 Kirino et al.
9,997,842 B2 6/2018 Kirino et al.
10,027,032 B2 7/2018 Kirino et al.
10,042,045 B2 8/2018 Kirino et al.
10,090,600 B2 10/2018 Kirino et al.
10,114,067 B2 10/2018 Lam et al.
10,153,533 B2 12/2018 Kirino
10,158,158 B2 12/2018 Kirino et al.
10,164,318 B2 12/2018 Seok et al.
10,164,344 B2 12/2018 Kirino et al.
10,186,787 B1 1/2019 Wang et al.
10,218,078 B2 2/2019 Kirino et al.
10,230,173 B2 3/2019 Kirino et al.
10,263,310 B2 4/2019 Kildal et al.
10,283,832 B1 5/2019 Chayat et al.
10,312,596 B2 6/2019 Gregoire
10,315,578 B2 6/2019 Kim et al.
10,320,083 B2 6/2019 Kirino et al.
10,333,227 B2 6/2019 Kirino et al.
10,374,323 B2 8/2019 Kamo et al.
10,381,317 B2 8/2019 Maaskant et al.
10,381,741 B2 8/2019 Kirino et al.
10,439,298 B2 10/2019 Kirino et al.
10,468,736 B2 11/2019 Mangaiahgari
10,505,282 B2 12/2019 Lilja
10,534,061 B2 1/2020 Vassilev et al.
10,559,889 B2 2/2020 Kirino et al.
10,594,045 B2 3/2020 Kirino et al.
10,601,144 B2 3/2020 Kamo et al.
10,608,345 B2 3/2020 Kirino et al.
10,613,216 B2 4/2020 Vacanti et al.
10,622,696 B2 4/2020 Kamo et al.
10,627,502 B2 4/2020 Kirino et al.
10,649,461 B2 5/2020 Han et al.
10,651,138 B2 5/2020 Kirino et al.
10,651,567 B2 5/2020 Kamo et al.
10,658,760 B2 5/2020 Kamo et al.
10,670,810 B2 6/2020 Sakr et al.
10,705,294 B2 7/2020 Guerber et al.
10,707,584 B2 7/2020 Kirino et al.
10,714,802 B2 7/2020 Kirino et al.
10,727,561 B2 7/2020 Kirino et al.
10,727,611 B2 7/2020 Kirino et al.
10,763,590 B2 9/2020 Kirino et al.
10,763,591 B2 9/2020 Kirino et al.
10,775,573 B1 9/2020 Hsu et al.
10,811,373 B2 10/2020 Zaman et al.
10,826,147 B2 11/2020 Sikina et al.
10,833,382 B2 11/2020 Sysouphat
10,833,385 B2 11/2020 Mangaiahgari
10,892,536 B2 1/2021 Fan et al.
10,944,184 B2 3/2021 Shi et al.
10,957,971 B2 3/2021 Doyle et al.
10,957,988 B2 3/2021 Kirino et al.
10,962,628 B1 3/2021 Laifenfeld et al.
10,971,824 B2 4/2021 Baumgartner et al.
10,983,194 B1 4/2021 Patel et al.
10,985,434 B2 4/2021 Wagner et al.
10,992,056 B2 4/2021 Kamo et al.
11,061,110 B2 7/2021 Kamo et al.
11,088,432 B2 8/2021 Seok et al.
11,088,464 B2 8/2021 Sato et al.
11,114,733 B2 9/2021 Doyle et al.
11,121,441 B1 9/2021 Rmili et al.
11,121,475 B2 9/2021 Yang et al.
11,169,325 B2 11/2021 Guerber et al.
11,171,399 B2 11/2021 Alexanian et al.
11,196,171 B2 12/2021 Doyle et al.
11,201,414 B2 12/2021 Doyle et al.
11,249,011 B2 2/2022 Challener
11,283,162 B2 3/2022 Doyle et al.
11,289,787 B2 3/2022 Yang
11,349,183 B2 5/2022 Rahiminejad et al.
11,349,220 B2 5/2022 Alexanian et al.
11,378,683 B2 7/2022 Alexanian et al.
11,411,292 B2 8/2022 Kirino
11,444,364 B2 9/2022 Shi
11,495,871 B2 11/2022 Vosoogh et al.
11,563,259 B2 1/2023 Alexanian et al.
11,611,138 B2 3/2023 Ogawa et al.

(56) References Cited

U.S. PATENT DOCUMENTS

| | | | |
|---|---|---|---|
| 11,616,282 B2 | 3/2023 | Yao et al. | |
| 11,626,652 B2 | 4/2023 | Vilenskiy et al. | |
| 2002/0021197 A1 | 2/2002 | Elco | |
| 2003/0052828 A1 | 3/2003 | Scherzer et al. | |
| 2004/0041663 A1 | 3/2004 | Uchimura et al. | |
| 2004/0069984 A1 | 4/2004 | Estes et al. | |
| 2004/0090290 A1 | 5/2004 | Teshirogi et al. | |
| 2004/0174315 A1 | 9/2004 | Miyata | |
| 2005/0146474 A1 | 7/2005 | Bannon | |
| 2005/0237253 A1 | 10/2005 | Kuo et al. | |
| 2006/0038724 A1 | 2/2006 | Tikhov et al. | |
| 2006/0113598 A1 | 6/2006 | Chen et al. | |
| 2006/0158382 A1 | 7/2006 | Nagai | |
| 2007/0013598 A1 | 1/2007 | Artis et al. | |
| 2007/0054064 A1 | 3/2007 | Ohmi et al. | |
| 2007/0103381 A1 | 5/2007 | Upton | |
| 2008/0129409 A1 | 6/2008 | Nagaishi et al. | |
| 2008/0150821 A1 | 6/2008 | Koch et al. | |
| 2009/0040132 A1 | 2/2009 | Sridhar et al. | |
| 2009/0207090 A1 | 8/2009 | Pettus et al. | |
| 2009/0243762 A1 | 10/2009 | Chen et al. | |
| 2009/0243766 A1* | 10/2009 | Miyagawa | H01P 1/027 333/249 |
| 2009/0300901 A1 | 12/2009 | Artis et al. | |
| 2010/0134376 A1 | 6/2010 | Margomenos et al. | |
| 2010/0321265 A1 | 12/2010 | Yamaguchi et al. | |
| 2011/0181482 A1 | 7/2011 | Adams et al. | |
| 2012/0013421 A1 | 1/2012 | Hayata | |
| 2012/0050125 A1 | 3/2012 | Leiba et al. | |
| 2012/0056776 A1 | 3/2012 | Shijo et al. | |
| 2012/0068316 A1 | 3/2012 | Ligander | |
| 2012/0163811 A1 | 6/2012 | Doany et al. | |
| 2012/0194399 A1 | 8/2012 | Bily et al. | |
| 2012/0242421 A1 | 9/2012 | Robin et al. | |
| 2012/0256796 A1 | 10/2012 | Leiba | |
| 2012/0280770 A1 | 11/2012 | Abhari et al. | |
| 2013/0057358 A1 | 3/2013 | Anthony et al. | |
| 2013/0082801 A1 | 4/2013 | Rofougaran et al. | |
| 2013/0300602 A1 | 11/2013 | Zhou et al. | |
| 2014/0015709 A1 | 1/2014 | Shijo et al. | |
| 2014/0091884 A1 | 4/2014 | Flatters | |
| 2014/0106684 A1 | 4/2014 | Burns et al. | |
| 2014/0327491 A1 | 11/2014 | Kim et al. | |
| 2015/0097633 A1 | 4/2015 | Devries et al. | |
| 2015/0229017 A1 | 8/2015 | Suzuki et al. | |
| 2015/0229027 A1 | 8/2015 | Sonozaki et al. | |
| 2015/0263429 A1 | 9/2015 | Vahidpour et al. | |
| 2015/0333726 A1 | 11/2015 | Xue et al. | |
| 2015/0357698 A1 | 12/2015 | Kushta | |
| 2015/0364804 A1 | 12/2015 | Tong et al. | |
| 2015/0364830 A1 | 12/2015 | Tong et al. | |
| 2016/0043455 A1 | 2/2016 | Seler et al. | |
| 2016/0049714 A1 | 2/2016 | Ligander et al. | |
| 2016/0056541 A1 | 2/2016 | Tageman et al. | |
| 2016/0118705 A1 | 4/2016 | Tang et al. | |
| 2016/0126637 A1 | 5/2016 | Uemichi | |
| 2016/0195612 A1 | 7/2016 | Shi | |
| 2016/0204495 A1 | 7/2016 | Takeda et al. | |
| 2016/0211582 A1* | 7/2016 | Saraf | H01Q 21/064 |
| 2016/0276727 A1 | 9/2016 | Dang et al. | |
| 2016/0293557 A1 | 10/2016 | Topak et al. | |
| 2016/0301125 A1 | 10/2016 | Kim et al. | |
| 2017/0003377 A1 | 1/2017 | Menge | |
| 2017/0012335 A1 | 1/2017 | Boutayeb | |
| 2017/0084554 A1 | 3/2017 | Dogiamis et al. | |
| 2017/0288313 A1 | 10/2017 | Chung et al. | |
| 2017/0294719 A1 | 10/2017 | Tatomir | |
| 2017/0324135 A1 | 11/2017 | Blech et al. | |
| 2018/0013208 A1 | 1/2018 | Izadian et al. | |
| 2018/0032822 A1 | 2/2018 | Frank et al. | |
| 2018/0123245 A1 | 5/2018 | Toda et al. | |
| 2018/0131084 A1 | 5/2018 | Park et al. | |
| 2018/0212324 A1 | 7/2018 | Tatomir | |
| 2018/0226709 A1 | 8/2018 | Mangaiahgari | |
| 2018/0233465 A1 | 8/2018 | Spella et al. | |
| 2018/0254563 A1 | 9/2018 | Sonozaki et al. | |
| 2018/0284186 A1 | 10/2018 | Chadha et al. | |
| 2018/0301819 A1 | 10/2018 | Kirino et al. | |
| 2018/0301820 A1 | 10/2018 | Bregman et al. | |
| 2018/0343711 A1 | 11/2018 | Wixforth et al. | |
| 2018/0351261 A1 | 12/2018 | Kamo et al. | |
| 2018/0375185 A1 | 12/2018 | Kirino et al. | |
| 2019/0006743 A1 | 1/2019 | Kirino et al. | |
| 2019/0013563 A1 | 1/2019 | Takeda et al. | |
| 2019/0057945 A1 | 2/2019 | Maaskant et al. | |
| 2019/0109361 A1 | 4/2019 | Ichinose et al. | |
| 2019/0115644 A1 | 4/2019 | Wang et al. | |
| 2019/0187247 A1 | 6/2019 | Izadian et al. | |
| 2019/0245276 A1 | 8/2019 | Li et al. | |
| 2019/0252778 A1 | 8/2019 | Duan | |
| 2019/0260137 A1 | 8/2019 | Watanabe et al. | |
| 2019/0324134 A1 | 10/2019 | Cattle | |
| 2020/0021001 A1 | 1/2020 | Mangaiahgari | |
| 2020/0044360 A1 | 2/2020 | Kamo et al. | |
| 2020/0059002 A1 | 2/2020 | Renard et al. | |
| 2020/0064483 A1 | 2/2020 | Li et al. | |
| 2020/0076086 A1 | 3/2020 | Cheng et al. | |
| 2020/0106171 A1 | 4/2020 | Shepeleva et al. | |
| 2020/0112077 A1 | 4/2020 | Kamo et al. | |
| 2020/0166637 A1 | 5/2020 | Hess et al. | |
| 2020/0203849 A1 | 6/2020 | Lim et al. | |
| 2020/0212594 A1 | 7/2020 | Kirino et al. | |
| 2020/0235453 A1 | 7/2020 | Lang | |
| 2020/0284907 A1 | 9/2020 | Gupta et al. | |
| 2020/0287293 A1 | 9/2020 | Shi et al. | |
| 2020/0319293 A1 | 10/2020 | Kuriyama et al. | |
| 2020/0343612 A1 | 10/2020 | Shi | |
| 2020/0346581 A1 | 11/2020 | Lawson et al. | |
| 2020/0373678 A1 | 11/2020 | Park et al. | |
| 2021/0028528 A1 | 1/2021 | Alexanian et al. | |
| 2021/0036393 A1 | 2/2021 | Mangaiahgari | |
| 2021/0104818 A1 | 4/2021 | Li et al. | |
| 2021/0110217 A1 | 4/2021 | Gunel | |
| 2021/0159577 A1 | 5/2021 | Carlred et al. | |
| 2021/0218154 A1 | 7/2021 | Shi et al. | |
| 2021/0242581 A1 | 8/2021 | Rossiter et al. | |
| 2021/0249777 A1 | 8/2021 | Alexanian et al. | |
| 2021/0305667 A1 | 9/2021 | Bencivenni | |
| 2022/0094071 A1 | 3/2022 | Doyle et al. | |
| 2022/0109246 A1 | 4/2022 | Emanuelsson et al. | |
| 2022/0196794 A1 | 6/2022 | Foroozesh et al. | |

FOREIGN PATENT DOCUMENTS

| | | |
|---|---|---|
| CN | 1620738 A | 5/2005 |
| CN | 2796131 | 7/2006 |
| CN | 101584080 A | 11/2009 |
| CN | 201383535 | 1/2010 |
| CN | 201868568 U | 6/2011 |
| CN | 102157787 A | 8/2011 |
| CN | 102420352 A | 4/2012 |
| CN | 103326125 A | 9/2013 |
| CN | 203277633 U | 11/2013 |
| CN | 103490168 A | 1/2014 |
| CN | 103515682 A | 1/2014 |
| CN | 102142593 B | 6/2014 |
| CN | 104101867 A | 10/2014 |
| CN | 104900956 A | 9/2015 |
| CN | 104993254 A | 10/2015 |
| CN | 105071019 A | 11/2015 |
| CN | 105609909 A | 5/2016 |
| CN | 105680133 A | 6/2016 |
| CN | 105958167 A | 9/2016 |
| CN | 107317075 A | 11/2017 |
| CN | 108258392 A | 7/2018 |
| CN | 109286081 A | 1/2019 |
| CN | 109643856 A | 4/2019 |
| CN | 109980361 A | 7/2019 |
| CN | 110085990 A | 8/2019 |
| CN | 209389219 U | 9/2019 |
| CN | 110401022 A | 11/2019 |
| CN | 111123210 A | 5/2020 |
| CN | 111480090 A | 7/2020 |
| CN | 108376821 B | 10/2020 |

(56) References Cited

FOREIGN PATENT DOCUMENTS

| | | | |
|---|---|---|---|
| CN | 110474137 | B | 11/2020 |
| CN | 109326863 | B | 12/2020 |
| CN | 112241007 | A | 1/2021 |
| CN | 212604823 | U | 2/2021 |
| CN | 112986951 | A | 6/2021 |
| CN | 112290182 | B | 7/2021 |
| CN | 113193323 | B | 10/2021 |
| CN | 214706247 | U | 11/2021 |
| DE | 112017006415 | | 9/2019 |
| DE | 102019200893 | A1 | 7/2020 |
| EP | 0174579 | A2 | 3/1986 |
| EP | 0818058 | A1 | 1/1998 |
| EP | 2267841 | A1 | 12/2010 |
| EP | 2500978 | A1 | 9/2012 |
| EP | 2843758 | A1 | 3/2015 |
| EP | 2766224 | B1 | 12/2018 |
| EP | 3460903 | A1 | 3/2019 |
| EP | 3785995 | A1 | 3/2021 |
| EP | 3862773 | A1 | 8/2021 |
| EP | 4089840 | A1 | 11/2022 |
| GB | 893008 | A | 4/1962 |
| GB | 2463711 | A | 3/2010 |
| GB | 2489950 | A | 10/2012 |
| JP | 2000183222 | A | 6/2000 |
| JP | 2003198242 | A | 7/2003 |
| JP | 2003289201 | A | 10/2003 |
| JP | 5269902 | B2 | 8/2013 |
| JP | 2013187752 | A | 9/2013 |
| JP | 2015216533 | A | 12/2015 |
| KR | 20080044752 | A | 5/2008 |
| KR | 1020080044752 | A | 5/2008 |
| KR | 20080105396 | A | 12/2008 |
| KR | 101092846 | B1 | 12/2011 |
| KR | 102154338 | B1 | 9/2020 |
| WO | 9934477 | A1 | 7/1999 |
| WO | 2013189513 | A1 | 12/2013 |
| WO | 2018003932 | A1 | 1/2018 |
| WO | 2018052335 | A1 | 3/2018 |
| WO | 2019085368 | A1 | 5/2019 |
| WO | 2020082363 | A1 | 4/2020 |
| WO | 2021072380 | A1 | 4/2021 |
| WO | 2022122319 | A1 | 6/2022 |
| WO | 2022225804 | A1 | 10/2022 |

OTHER PUBLICATIONS

Yu, et al., "Optimization and Implementation of SIW Slot Array for Both Medium- and Long-Range 77 GHz Automotive Radar Application", IEEE Transactions on Antennas and Propagation, vol. 66, No. 7, Jul. 2018, pp. 3769-3774.
Yuasa, et al., "A millimeter wave wideband differential line to waveguide transition using short ended slot line", Oct. 2014, pp. 1004-1007.
"Extended European Search Report", EP Application No. 23158037.4, Aug. 17, 2023, 9 pages.
"Extended European Search Report", EP Application No. 23158947.4, Aug. 17, 2023, 11 pages.
"Foreign Office Action", CN Application No. 202111550163.3, Jun. 17, 2023, 25 pages.
"Foreign Office Action", CN Application No. 202111550448.7, Jun. 17, 2023, 19 pages.
"Foreign Office Action", CN Application No. 202111551711.4, Jun. 17, 2023, 29 pages.
"Foreign Office Action", CN Application No. 202111551878.0, Jun. 15, 2023, 20 pages.
"Foreign Office Action", CN Application No. 202111563233.9, May 31, 2023, 15 pages.
"Foreign Office Action", CN Application No. 202111652507.1, Jun. 26, 2023, 14 pages.
"Foreign Office Action", CN Application No. 202210251362.2, Jun. 28, 2023, 15 pages.
Ghassemi, et al., "Millimeter-Wave Integrated Pyramidal Horn Antenna Made of Multilayer Printed Circuit Board (PCB) Process", IEEE Transactions on Antennas and Propagation, vol. 60, No. 9, Sep. 2012, pp. 4432-4435.
Hausman, et al., "Termination Insensitive Mixers", 2011 IEEE International Conference on Microwaves, Communications, Antennas and Electronic Systems (COMCAS 2011), Dec. 19, 2011, 13 pages.
Aulia Dewantari et al., "Flared SIW antenna design and transceiving experiments for W-band SAR", International Journal of RF and Microwave Computer-Aided Engineering, Wiley Interscience, Hoboken, USA, vol. 28, No. 9, May 9, 2018, XP072009558.
"Extended European Search Report", EP Application No. 18153137.7, Jun. 15, 2018, 8 pages.
"Extended European Search Report", EP Application No. 20155296.5, Jul. 13, 2020, 12 pages.
"Extended European Search Report", EP Application No. 20166797, Sep. 16, 2020, 11 pages.
"Extended European Search Report", EP Application No. 21211165.2, May 13, 2022, 12 pages.
"Extended European Search Report", EP Application No. 21211167.8, May 19, 2022, 10 pages.
"Extended European Search Report", EP Application No. 21211168.6, May 13, 2022, 11 pages.
"Extended European Search Report", EP Application No. 21211452.4, May 16, 2022, 10 pages.
"Extended European Search Report", EP Application No. 21211474.8, Apr. 20, 2022, 14 pages.
"Extended European Search Report", EP Application No. 21211478.9, May 19, 2022, 10 pages.
"Extended European Search Report", EP Application No. 21212703.9, May 3, 2022, 13 pages.
"Extended European Search Report", EP Application No. 21215901.6, Jun. 9, 2022, 8 pages.
"Extended European Search Report", EP Application No. 21216319.0, Jun. 10, 2022, 12 pages.
"Extended European Search Report", EP Application No. 22160898.7, Aug. 4, 2022, 11 pages.
"Extended European Search Report", EP Application No. 22166998.9, Sep. 9, 2022, 12 pages.
"Extended European Search Report", EP Application No. 22183888.1, Dec. 20, 2022, 10 pages.
"Extended European Search Report", EP Application No. 22183892.3, Dec. 2, 2022, 8 pages.
"Extended European Search Report", EP Application No. 22184924.3, Dec. 2, 2022, 13 pages.
"Foreign Office Action", CN Application No. 201810122408.4, Jun. 2, 2021, 15 pages.
"Foreign Office Action", CN Application No. 201810122408.4, Oct. 18, 2021, 19 pages.
"Foreign Office Action", CN Application No. 202010146513.9, Feb. 7, 2022, 14 pages.
"WR-90 Waveguides", Pasternack Enterprises, Inc., 2016, Retrieved from https://web.archive.org/web/20160308205114/http://www.pasternack.com:80/wr-90-waveguides-category.aspx, 2 pages.
Adams, et al., "Dual Band Frequency Scanned, Height Finder Antenna", 1991 21st European Microwave Conference, 1991, 6 pages.
Alhuwaimel, et al., "Performance Enhancement of a Slotted Waveguide Antenna by Utilizing Parasitic Elements", Sep. 7, 2015, pp. 1303-1306.
Bauer, et al., "A wideband transition from substrate integrated waveguide to differential microstrip lines in multilayer substrates", Sep. 2010, pp. 811-813.
Chaloun, et al., "A Wideband 122 GHz Cavity-Backed Dipole Antenna for Millimeter-Wave Radar Altimetry", 2020 14th European Conference on Antennas and Propagation (EUCAP), Mar. 15, 2020, 4 pages.
Deutschmann, et al., "A Full W-Band Waveguide-to-Differential Microstrip Transition", Jun. 2019, pp. 335-338.
Furtula, et al., "Waveguide Bandpass Filters for Millimeter-Wave Radiometers", Journal of Infrared, Millimeter and Terahertz Waves, 2013, 9 pages.

(56) References Cited

OTHER PUBLICATIONS

Giese, et al., "Compact Wideband Single-ended and Differential Microstrip-to-waveguide Transitions at W-band", Jul. 2015, 4 pages.
Gray, et al., "Carbon Fibre Reinforced Plastic Slotted Waveguide Antenna", Proceedings of Asia-Pacific Microwave Conference 2010, pp. 307-310.
Hansen, et al., "D-Band FMCW Radar Sensor for Industrial Wideband Applications with Fully-Differential MMIC-to-RWG Interface in SIW", 2021 IEEE/MTT-S International Microwave Symposium, Jun. 7, 2021, pp. 815-818.
Hasan, et al., "F-Band Differential Microstrip Patch Antenna Array and Waveguide to Differential Microstrip Line Transition for FMCW Radar Sensor", IEEE Sensors Journal, vol. 19, No. 15, Aug. 1, 2019, pp. 6486-6496.
Hausman, "Termination Insensitive Mixers", 2011 IEEE International Conference on Microwaves, Communications, Antennas and Electronic Systems (COMCAS 2011), Nov. 7, 2011, 13 pages.
Huang, et al., "The Rectangular Waveguide Board Wall Slot Array Antenna Integrated with One Dimensional Subwavelength Periodic Corrugated Grooves and Artificially Soft Surface Structure", Dec. 20, 2008, 10 pages.
Jankovic, et al., "Stepped Bend Substrate Integrated Waveguide to Rectangular Waveguide Transitions", Jun. 2016, 2 pages.
Li, et al., "Millimetre-wave slotted array antenna based on double-layer substrate integrated waveguide", Jun. 1, 2015, pp. 882-888.
Lin, et al., "A THz Waveguide Bandpass Filter Design Using an Artificial Neural Network", Micromachines 13(6), May 2022, 11 pages.
Mak, et al., "A Magnetoelectric Dipole Leaky-Wave Antenna for Millimeter-Wave Application", Dec. 12, 2017, pp. 6395-6402.
Mallahzadeh, et al., "A Low Cross-Polarization Slotted Ridged SIW Array Antenna Design With Mutual Coupling Considerations", Jul. 17, 2015, pp. 4324-4333.
Ogiwara, et al., "2-D MoM Analysis of the Choke Structure for Isolation Improvement between Two Waveguide Slot Array Antennas", Proceedings of Asia-Pacific Microwave Conference 2007, 4 pages.
Razmhosseini, et al., "Parasitic Slot Elements for Bandwidth Enhancement of Slotted Waveguide Antennas", 2019 IEEE 90th Vehicular Technology Conference, Sep. 2019, 5 pages.
Rossello, et al., "Substrate Integrated Waveguide Aperture Coupled Patch Antenna Array for 24 GHz Wireless Backhaul and Radar Applications", Nov. 16, 2014, 2 pages.
Schneider, et al., "A Low-Loss W-Band Frequency-Scanning Antenna for Wideband Multichannel Radar Applications", IEEE Antennas and Wireless Propagation Letters, vol. 18, No. 4, Apr. 2019, pp. 806-810.
Serrano, et al., "Lowpass Filter Design for Space Applications in Waveguide Technology Using Alternative Topologies", Jan. 2013, 117 pages.
Shehab, et al., "Substrate-Integrated-Waveguide Power Dividers", Oct. 15, 2019, pp. 27-38.
Tong, et al., "A Wide Band Transition from Waveguide to Differential Microstrip Lines", Dec. 2008, 5 pages.
Wang, et al., "A 79-GHz LTCC differential microstrip line to laminated waveguide transition using high permittivity material", Dec. 2010, pp. 1593-1596.
Wang, et al., "Low-loss frequency scanning planar array with hybrid feeding structure for low-altitude detection radar", Sep. 13, 2019, pp. 6708-6711.
Wang, et al., "Mechanical and Dielectric Strength of Laminated Epoxy Dielectric Graded Materials", Mar. 2020, 15 pages.
Wu, et al., "A Planar W-Band Large-Scale High-Gain Substrate-Integrated Waveguide Slot Array", Feb. 3, 2020, pp. 6429-6434.
Wu, et al., "The Substrate Integrated Circuits—A New Concept for High-Frequency Electronics and Optoelectronics", Dec. 2003, 8 pages.

* cited by examiner

SYMMETRICAL TWO-PIECE WAVEGUIDE

BACKGROUND

Some devices (e.g., radar devices) use electromagnetic signals to detect and track objects. The electromagnetic signals are transmitted and received using antennas which may be characterized in terms of gains, beam widths, or, more specifically, in terms of antenna patterns, which are measures of the antenna gains as functions of directions. Waveguides are often used to change or improve such antenna patterns.

Two-piece waveguides have been developed that enable mass production, e.g., through injection molding two separate pieces and connecting them together to form a waveguide. Many two-piece waveguides, however, necessitate the use of conductive adhesives or solder to mitigate leakage through the joint between the two pieces. The use of solder increases complexity and/or costs of the waveguides.

SUMMARY

This document is directed to a symmetrical two-piece waveguide. Some aspects described below include a waveguide that comprises an upper structure forming a first symmetrical portion of at least one channel that defines an energy path for electromagnetic energy to propagate between an input portion and a radiator portion of the channel. The waveguide further comprises a lower structure forming a second symmetrical portion of the channel that is aligned about a separation plane with the first symmetrical portion formed by the upper structure. The upper structure further forms the radiator portion to extend from the first symmetrical portion, orthogonal to the separation plane, and away from the second symmetrical portion. The lower structure further forms the input portion to extend from the second symmetrical portion, orthogonal to the separation plane, and away from the first symmetrical portion.

Other aspects described below include a method of forming a waveguide. The method comprises forming an upper structure of a waveguide that defines a first symmetrical portion of at least one channel for guiding electromagnetic energy between an input portion and a radiator portion of the channel. The method further comprises forming a lower structure of the waveguide that defines a second symmetrical portion of the channel that is aligned about a separation plane with the first symmetrical portion formed by the upper structure. The method also comprises mating the upper structure and the lower structure to form the waveguide. The upper structure also forms the radiator portion that extends from the first symmetrical portion, orthogonal to the separation plane, and away from the second symmetrical portion. The lower structure also forms the input portion that extends from the second symmetrical portion, orthogonal to the separation plane, and away from the first symmetrical portion.

This Summary introduces a simplified concept of, and a method of forming, a symmetrical two-piece waveguide that are further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

A symmetrical two-piece waveguide is described with reference to the following drawings that use some of the same numbers throughout to reference like or examples of like features and components.

DETAILED DESCRIPTION

Overview

Two-piece waveguides have been developed that provide benefits over single-piece waveguides. Many two-piece waveguides, however, necessitate the use of conductive adhesives or solder to mitigate leakage through the joints between the respective structures when they are assembled. The use of conductive adhesives or solder increases complexity and/or costs of the waveguides.

A symmetrical two-piece waveguide is described herein. The waveguide comprises an upper structure that forms a first symmetrical portion of at least one channel that defines an energy path between an input portion and a radiator portion of the channel. The waveguide further comprises a lower structure that forms a second symmetrical portion of the channel that is aligned about a separation plane with the first symmetrical portion. The upper structure further forms the radiator portion that extends from the first symmetrical portion, orthogonal to the separation plane, and away from the second symmetrical portion. The lower structure further forms the input portion that extends from the second symmetrical portion, orthogonal to the separation plane, and away from the first symmetrical portion.

By using symmetry, the disclosed waveguide leverages the benefits of a two-piece design while enabling near-lossless channeling of energy without the use of a conductive adhesive or solder between the pieces. Doing so enables the waveguide to be built easily, cheaply, and/or on a large scale.

Example Environment

Figure 1:
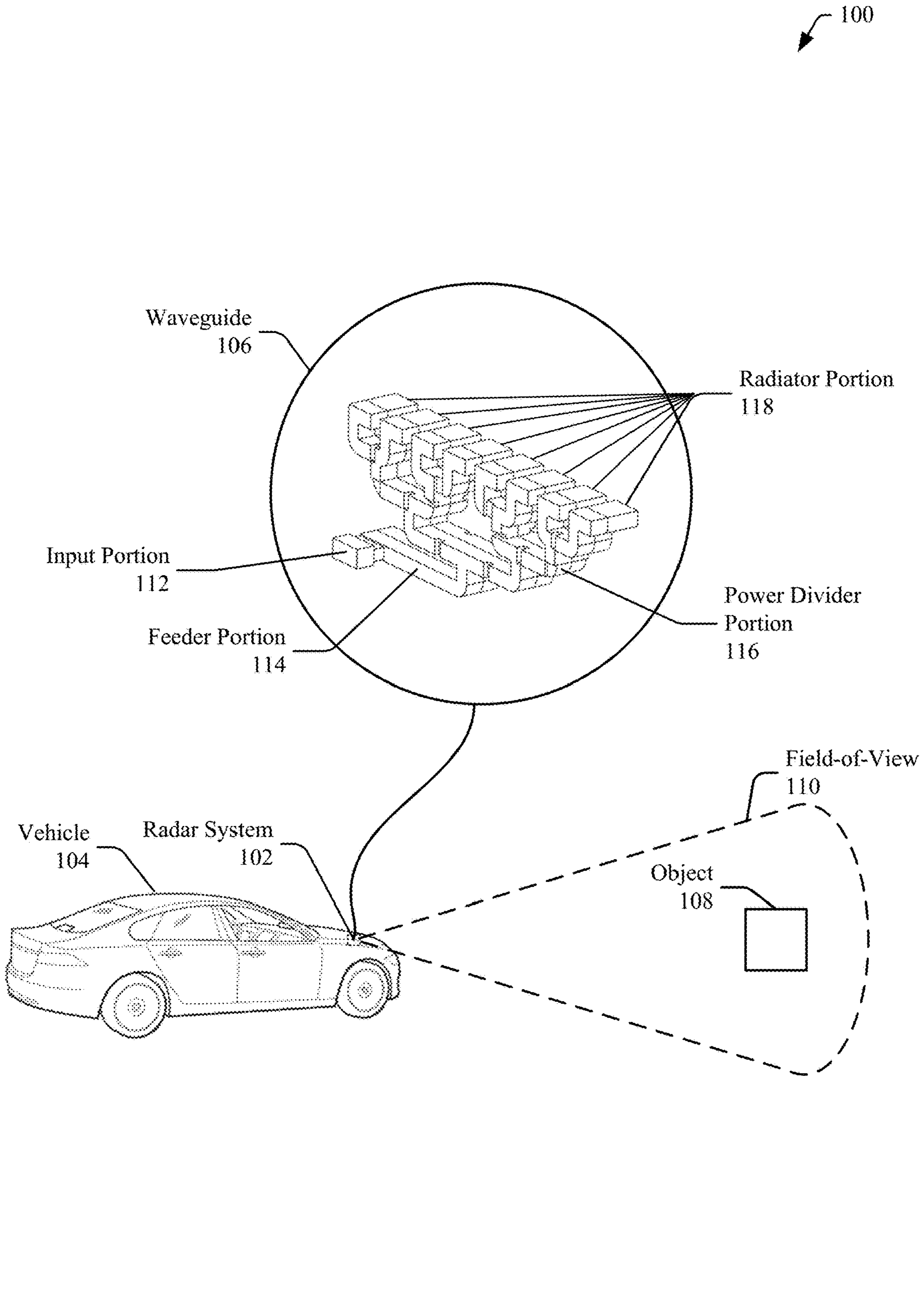
FIG. 1 illustrates, in accordance with this disclosure, an example environment where a symmetrical two-piece waveguide may be used.

FIG. 1 illustrates an example environment 100 where a symmetrical two-piece waveguide may be used. The example environment 100 contains a radar system 102 that is disposed within, disposed on, or dispersed throughout a vehicle 104. The radar system 102 contains a waveguide 106 (e.g., a symmetrical two-piece waveguide) that may be used by the radar system 102 to determine a proximity, an angle, or a velocity of one or more objects 108 in the proximity of the vehicle 104.

Although illustrated as a car, the vehicle 104 can represent other types of motorized vehicles (e.g., a motorcycle, a bus, a tractor, a semi-trailer truck, construction equipment), non-motorized vehicles (e.g., a bicycle), railed vehicles (e.g., a train or a trolley car), watercraft (e.g., a boat or a ship), aircraft (e.g., an airplane or a helicopter), or spacecraft (e.g., satellite). In general, manufacturers can mount the radar system 102 to any moving platform, including moving machinery or robotic equipment. In other implementations, other devices (e.g., desktop computers, tablets, laptops, televisions, computing watches, smartphones, gaming systems) may incorporate the radar system 102 with the waveguide 106 and support techniques described herein.

In the example environment 100, the radar system 102 can detect and track the object 108 by transmitting one or more radar signals and receiving reflections of the radar signals off the object 108. For example, the radar system 102 can transmit electromagnetic signals between 100 and 400 gigahertz (GHz), between 4 and 100 GHz, or between approximately 70 and 80 GHz via the waveguide 106 and/or receive the reflections via the waveguide 106.

The radar system 102 can be part of the vehicle 104. The vehicle 104 can also include at least one automotive system that relies on data from the radar system 102, including a driver-assistance system, an autonomous-driving system, or a semi-autonomous-driving system. The radar system 102 can include an interface to the automotive systems. The radar system 102 can output, via the interface, a signal based on electromagnetic energy (e.g., radar energy) received by the radar system 102.

Generally, the automotive systems use radar data provided by the radar system 102 to perform a function. For example, the driver-assistance system can provide blind-spot monitoring and generate an alert indicating a potential collision with the object 108 detected by the radar system 102. In this case, the radar data from the radar system 102 indicates when it is safe or unsafe to change lanes. The autonomous-driving system may move the vehicle 104 to a particular location on the road while avoiding collisions with the object 108 detected by the radar system 102. The radar data provided by the radar system 102 can provide information about a distance to and the location of the object 108 to enable the autonomous-driving system to perform emergency braking, perform a lane change, or adjust the speed of the vehicle 104.

The radar system 102 generally includes a transmitter (not illustrated) and at least one antenna (not illustrated) that may be within, comprised by, or attached to the waveguide 106 to transmit electromagnetic signals. The radar system 102 generally includes a receiver (not illustrated) and at least one antenna, including the waveguide 110, to receive reflected versions of these electromagnetic signals. The transmitter includes components for emitting electromagnetic signals. The receiver includes components to detect the reflected electromagnetic signals. The transmitter and the receiver can be incorporated together on the same integrated circuit (e.g., a transceiver integrated circuit) or separately on different integrated circuits.

The radar system 102 also includes one or more processors (not illustrated) and computer-readable storage media (CRM) (not illustrated). The processor can be a microprocessor or a system-on-chip. The processor executes instructions stored within the CRM. As an example, the processor can control the operation of the transmitter. The processor can also process electromagnetic energy received by the antenna and determine the location of the object 108 relative to the radar system 102. The processor can also generate radar data for the automotive systems. For example, the processor can control, based on processed electromagnetic energy from the antenna, an autonomous or semi-autonomous driving system of the vehicle 104.

The waveguide 110 includes two structures (e.g., an upper structure and a lower structure) that can be any solid material, including wood, carbon fiber, fiber glass, metal, plastic, or a combination thereof. The waveguide 110 can also include or be a portion of a printed circuit board (PCB). The waveguide 110 is designed to mechanically support and electrically connect components (e.g., an input portion 112, a feeder portion 114, a power divider portion 116, and a radiator portion 118) to a dielectric using conductive materials.

The input portion 112 may be configured to interface with an antenna and/or portions of a PCB (e.g., a monolithic microwave integrated circuit (MMIC)). To do so, the input portion 112 may contain a rectangular waveguide. For example, the input portion 112 may comprise a WR10 waveguide. The radiator portion 118 is configured to radiate electromagnetic (EM) energy (e.g., radar energy) and receive EM energy (e.g., radar energy). Between the input portion 112 and the radiator portion 118 are the feeder portion 114 and the power divider portion 116. The feeder portion 114 is configured to carry the EM energy along an energy path between the input portion 112 and the power divider portion 116. The power divider portion 116 is configured to divide the EM energy via one or more splits to respective radiators of the radiator portion 118. In other words, the power divider portion 116 is configured to divide power between portions of the radiator portion 118. If a single radiator is used, the feeder portion 114 may carry/propagate the EM energy between the input portion 112 and the radiator portion 118 without a power divider portion 116.

The waveguide 106 is split along a separation plane that is normal to a direction of the EM energy in the input portion 112 and the radiator portion 118. The separation plane splits the feeder portion 114 and the power divider portion 116 (as well as other portions as discussed below) into mirrored halves. It should be noted that the waveguide 106 is illustrated as the surfaces of an internal cavity formed by the waveguide 106. Two structures (not shown), e.g., upper and lower structures, contain respective cavities that form the waveguide 106. The upper and lower structures are configured to mate using any known techniques. However, the use of conductive adhesives or solder is not necessary.

Example Upper and Lower Portions

Figure 2:
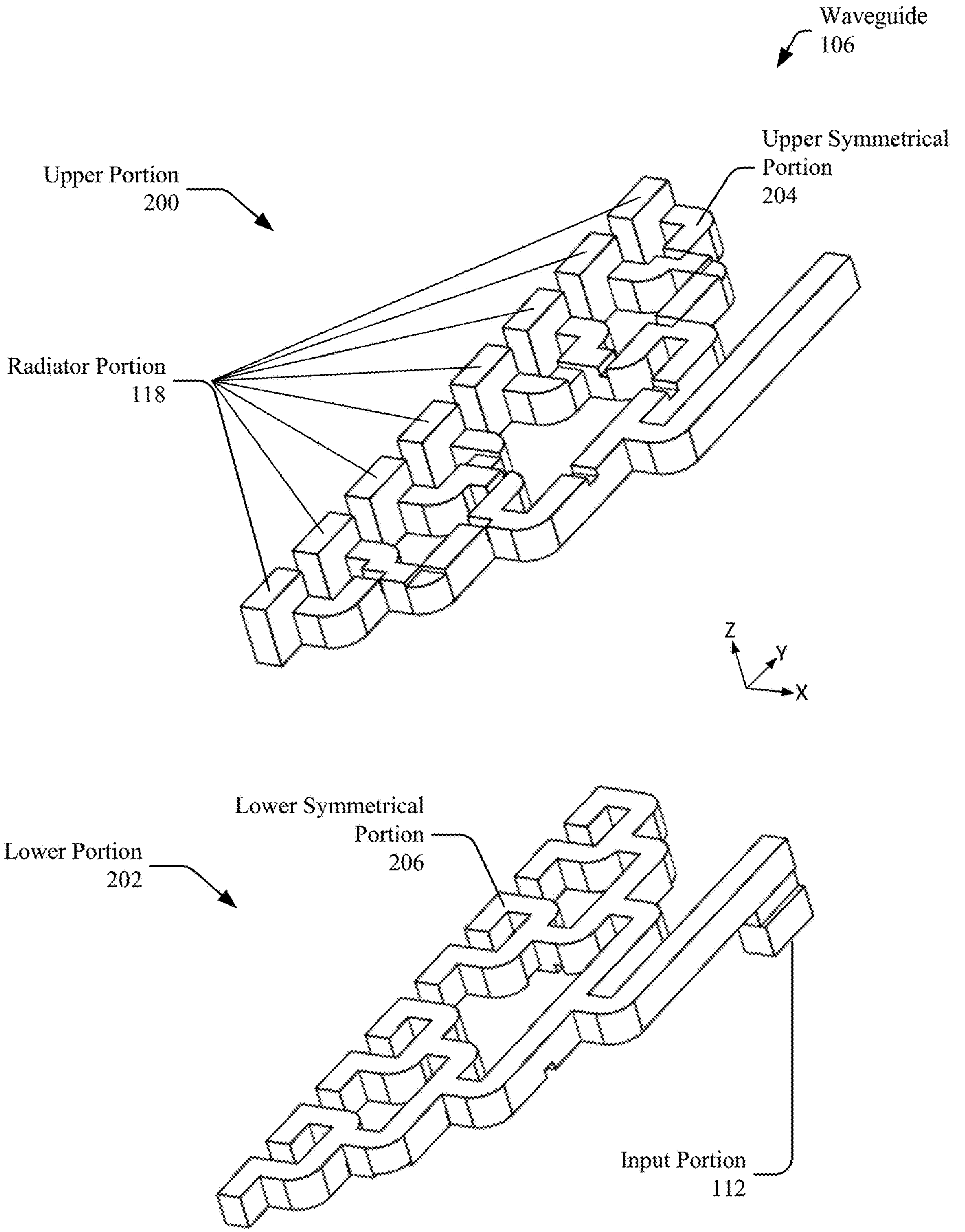
FIG. 2 illustrates, in accordance with this disclosure, example upper and lower portions of a symmetrical two-piece waveguide.

FIG. 2 illustrates an example of the waveguide 106. The waveguide 106 has been separated along the Z-axis to show two respective structures. A convention of the positive Z-direction being from lower to upper (e.g., bottom to top), the positive Y-direction being from left to right, and the positive X-direction being from back (e.g., rear) to front is used for illustration/discussion purposes only and should not be considered as a limitation. For example, the input portion 112 is at a front right bottom portion and the radiator portion is at a back top portion of the waveguide 106.

The waveguide 106 consists of two portions: an upper portion 200 and a lower portion 202. The upper portion 200 and the lower portion 202 each have a separation plane (not shown) that, when the waveguide 106 is assembled, are coincident. The separation plane of the upper portion 200 is coincident with the bottom surface of the upper portion 200, and the separation plane of the lower portion 202 is coincident with the top surface of the lower portion 202. The separation planes are parallel to the X-Y plane.

The upper portion 200 contains the radiator portion 118 and an upper symmetrical portion 204. The upper symmetrical portion 204 extends underneath the radiator portion 118, as discussed further below. The lower portion 202 contains the input portion 112 and a lower symmetrical portion 206, with the lower symmetrical portion 206 extending above the input portion 112, as discussed further below. The upper symmetrical portion 204 and the lower symmetrical portion 206 are mirrors of each other along the separation plane when assembled. By using symmetry, leakage through the separation plane is reduced or eliminated. Accordingly, the upper portion 200 and the lower portion 202 may be assembled without the use of solder or conductive adhesives.

Example Upper and Lower Symmetrical Portions

Figure 3A:
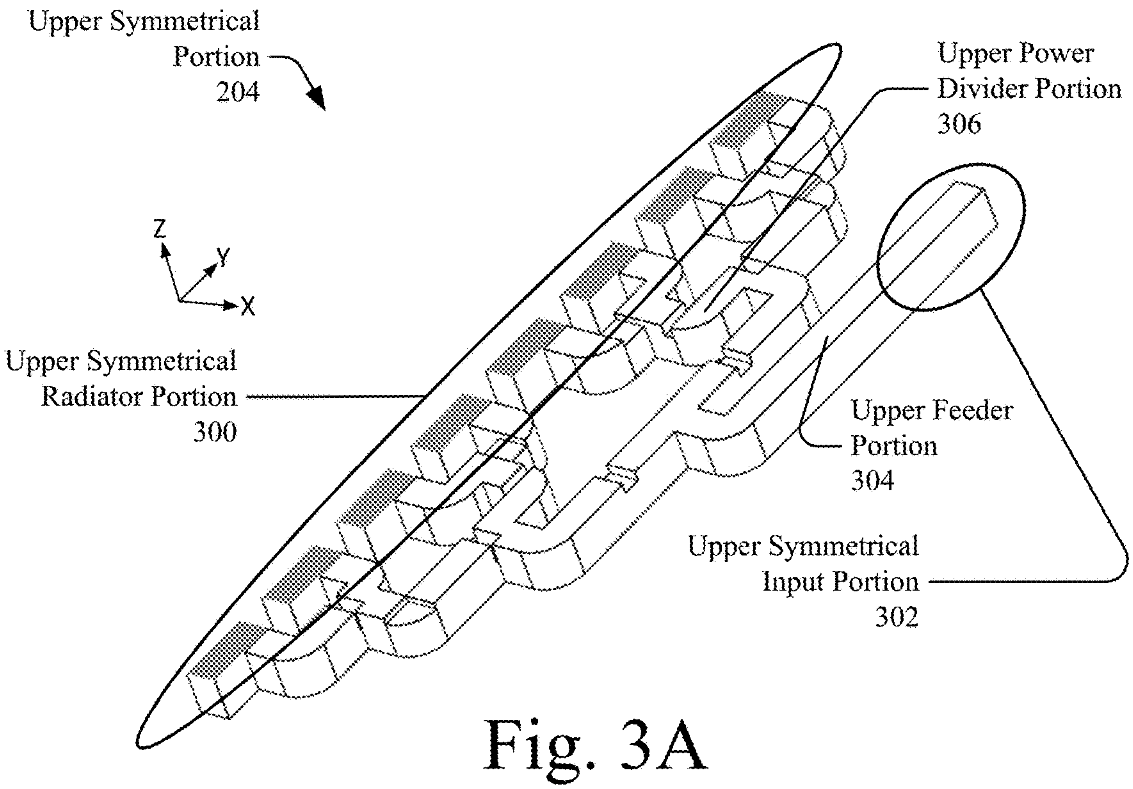
FIGS. 3A and 3B illustrate, in accordance with this disclosure, example upper and lower symmetrical portions of the upper and lower portions of FIG. 2.

FIG. 3A illustrates an example of the upper symmetrical portion 204 of the upper portion 200. The upper symmetrical portion 204 may be the upper portion 200 without the radiator portion 118. The upper symmetrical portion 204 comprises an upper symmetrical radiator portion 300 and an upper symmetrical input portion 302. Between the upper symmetrical radiator portion 300 and the upper symmetrical input portion 302 are an upper feeder portion 304 that is half of the feeder portion 114 and an upper power divider portion 306 that is half of the power divider portion 116.

Figure 3B:
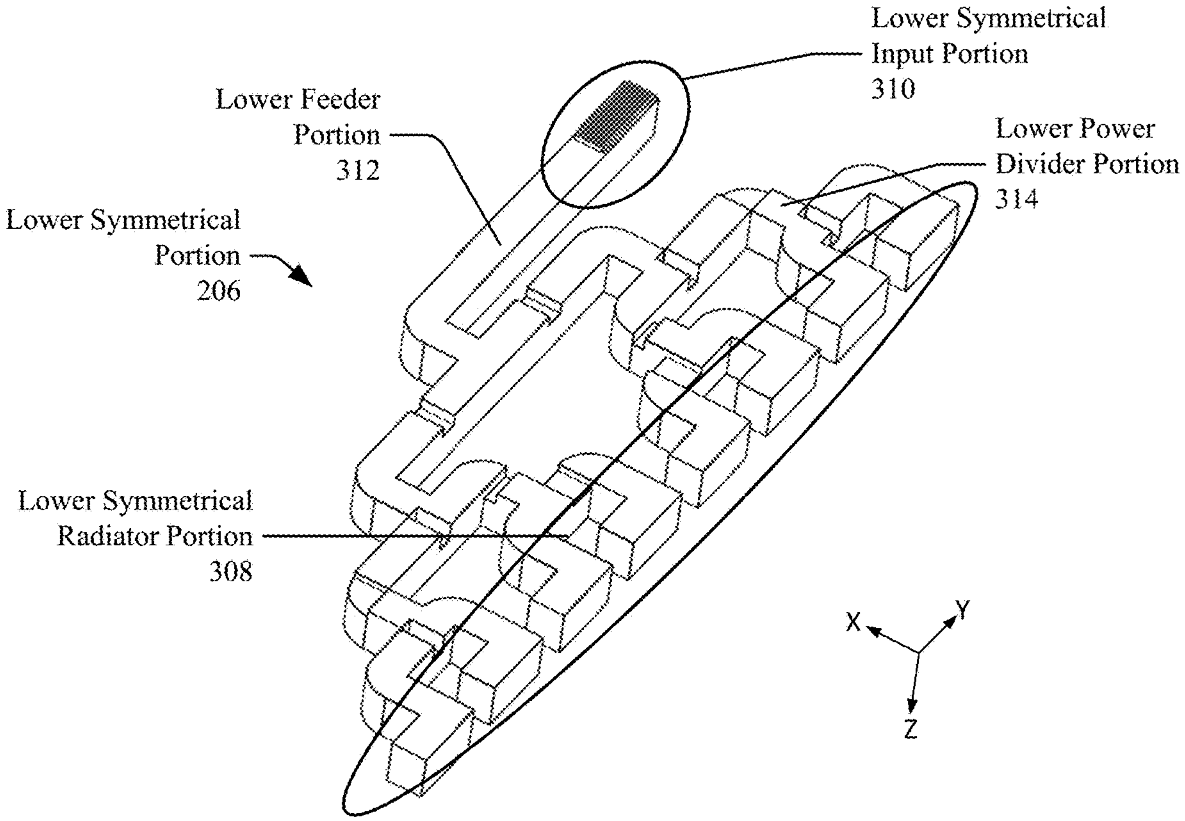

FIG. 3B illustrates an example of the lower symmetrical portion 206 of the lower portion 202. The lower symmetrical portion 206 may be the lower portion 202 without the input portion 112. The lower symmetrical portion 206 comprises a lower symmetrical radiator portion 308 and a lower symmetrical input portion 310. Between the lower symmetrical radiator portion 308 and the lower symmetrical input portion 310 are a lower feeder portion 312 that is half of the feeder portion 114 and an upper power divider portion 314 that is half of the power divider portion 116. The lower symmetrical input portion 310 is at a distal end of the lower feeder portion 312 and is symmetrical to (e.g., a mirror of) the upper symmetrical input portion 300 about the separation plane.

Example Non-Symmetrical Features

Figure 4A:
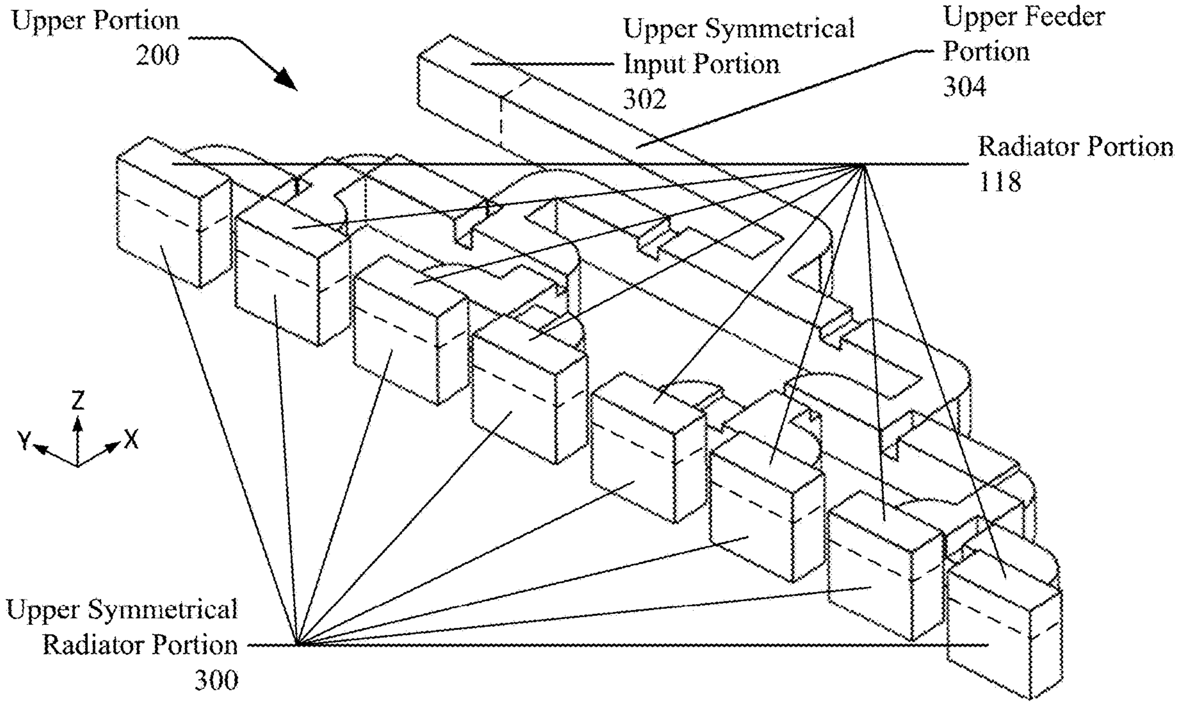
FIGS. 4A and 4B illustrate, in accordance with this disclosure, example portions of the upper and lower portions of FIG. 2.

FIG. 4A illustrates an example of the upper portion 200. It should be noted that the upper portion 200 comprises the upper symmetrical radiator portion 300 along with the radiator portion 118. In the illustrated example, an imaginary separation between the upper symmetrical radiator portion 300 and the radiator portion 118 is shown (e.g., dotted line). The radiator portion 118 extends from the upper symmetrical radiator portion 300 orthogonal and away from the separation plane (e.g., in the positive Z-direction). The X-Y footprint (e.g., cross section) of the radiator portion 118, the upper symmetrical radiator portion 300, and the lower symmetrical radiator portion 308 are all consistent (e.g., rectangular, rounded rectangular), with the upper symmetrical radiator portion 300 and the lower symmetrical radiator portion 308 being identical in 3D shape. Also illustrated is an imaginary separation (e.g., dotted line) between the upper symmetrical input portion 302 and the upper feeder portion 304.

By having the 90-degree changes in the energy path at or near the radiator portion 118 (e.g., no chamfers or rounded edges and the lower symmetrical radiator portion 308 mirroring the upper symmetrical radiator portion 300) leakage through the separation plane may be reduced or virtually eliminated. Because of the shape, the EM energy may have a shortest possible path across the separation plane at or near the radiator portion 118 (e.g., no EM energy crosses the separation plane at an angle). Doing so enables the waveguide 106 to be assembled without the use of solder or conductive adhesives while still achieving good performance.

Figure 4B:
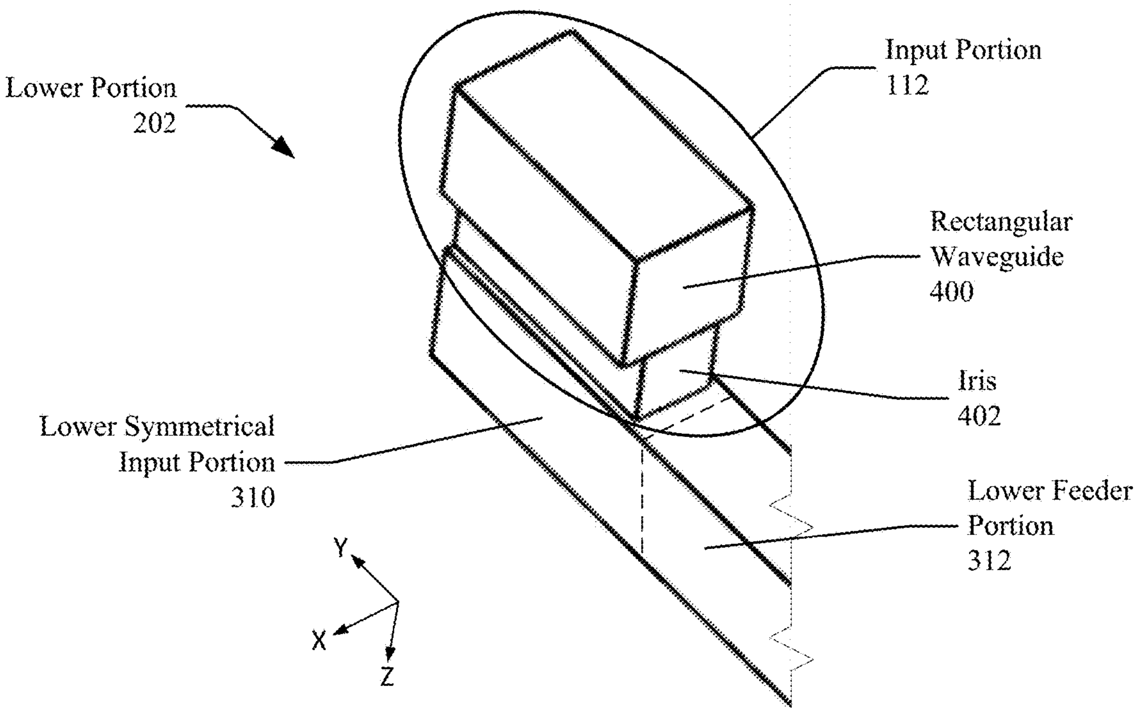

FIG. 4B illustrates an example portion of the lower portion 202 (e.g., proximate the input portion 112). It should be noted that the lower portion 202 comprises the lower symmetrical radiator portion 310 along with the input portion 112. In the illustrated example, an imaginary separation (e.g., dotted line) between the lower symmetrical input portion 310 and the lower feeder portion 312 is shown.

The input portion 112 extends from the lower symmetrical input portion 310 orthogonal and away from the separation plane (e.g., in the negative Z-direction). The X-Y footprint of the input portion 112, the lower symmetrical input portion 310, and the upper symmetrical input portion 302 are all consistent, with the lower symmetrical input portion 310 and the upper symmetrical input portion 302 being congruent in 3D shape.

By having the 90-degree changes in the energy path at or near the input portion 112 (e.g., no chamfers or rounded edges and the upper symmetrical input portion 302 mirroring the lower symmetrical input portion 310) leakage through the separation plane may be reduced or virtually eliminated. Because of the shape, the EM energy may have a shortest possible path across the separation plane at or near the input portion 112 (e.g., no EM energy crosses the separation plane at an angle). Similar to the upper portion 200, doing so enables the waveguide 106 to be assembled without the use of solder or conductive adhesives and still achieve good performance.

The input portion 112 contains a rectangular waveguide 400 and an iris 402. The rectangular waveguide 400 may be a rectangular or square waveguide (e.g., WR10 waveguide) configured to interface with an antenna of a circuit board. The iris 402 is configured to mitigate leakage through the separation plane due to the asymmetry of the input portion 112. The iris 402 may have a similar X-Y footprint as the rectangular waveguide 400 but be smaller in one or two dimensions according to application. Furthermore, the length of the iris 402 may be varied according to application.

Example Method

Figure 5:
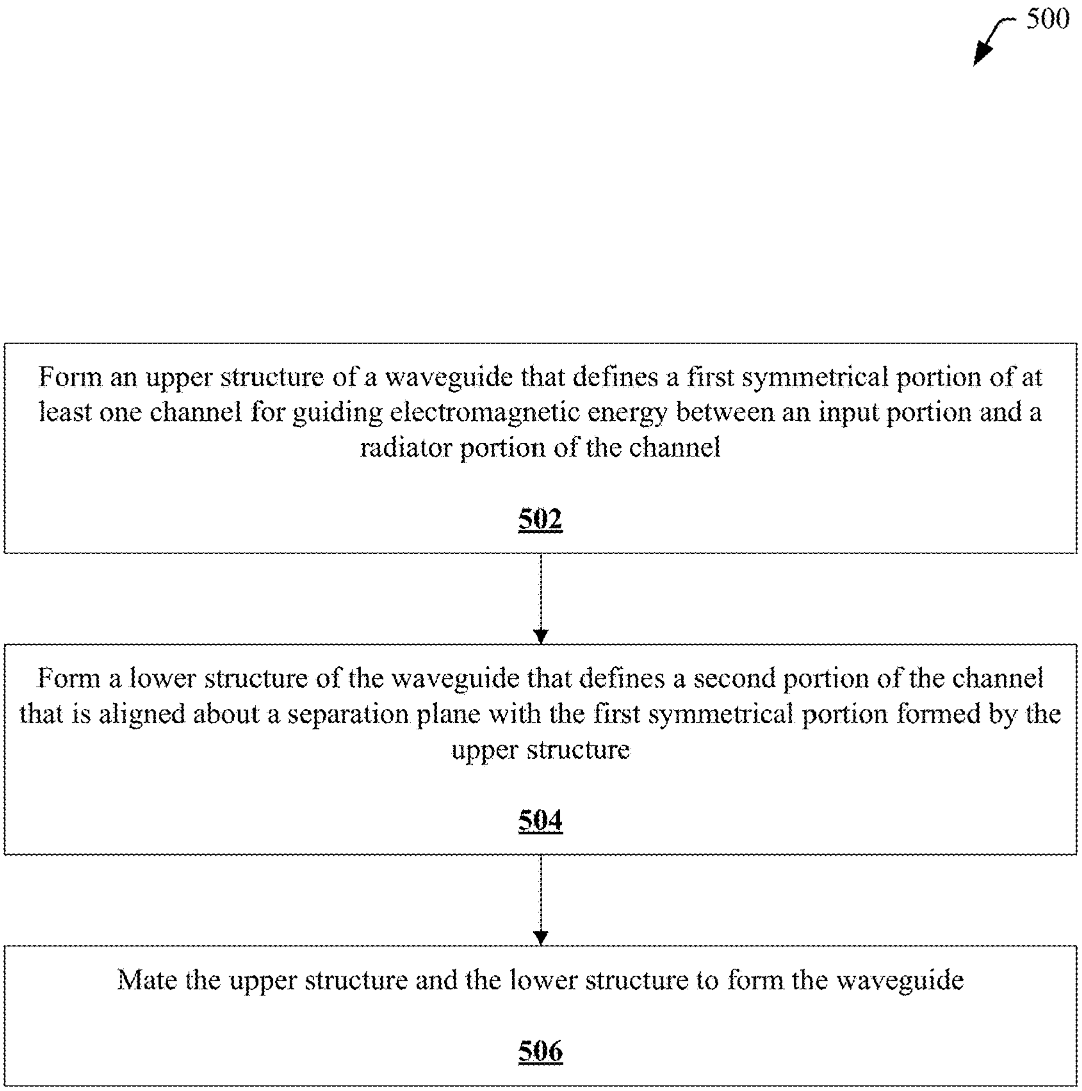
FIG. 5 illustrates, in accordance with this disclosure, an example method of forming a symmetrical two-piece waveguide.

FIG. 5 illustrates an example method 500 of forming a symmetrical two-piece waveguide. The order in which the operations are shown and/or described is not intended to be construed as a limitation, and the order may be rearranged without departing from the scope of this disclosure. Furthermore, any number of the operations can be combined with any other number of the operations to implement the example process flow or an alternate process flow.

At step 502, an upper structure of a waveguide is formed. The upper structure defines a first symmetrical portion of at least one channel for guiding electromagnetic energy between an input portion and a radiator portion of the channel. The upper structure further forms the radiator portion extending from the first symmetrical portion, orthogonal to a separation plane, and away from a second symmetrical portion. For example, the upper structure that forms the upper portion 200 may be formed. The upper structure may be formed using computer numeric control (CNC), injection molding, casting, machining, or any other manufacturing process and may be formed of metal or plastic. As part of forming the upper structure, surfaces of the upper structure (e.g., the upper portion 200) may be metallicized (e.g., if the upper structure is formed of a non-conductive material). The radiator portion 118 may extend to an external surface of the upper structure when the upper structure is attached to a lower structure.

At step 504, the lower structure of the waveguide is formed. The lower structure defines the second symmetrical portion of the channel that is aligned about a separation plane with the first symmetrical portion formed by the upper structure. The lower structure further forms the input portion extending from the second symmetrical portion, orthogonal to the separation plane, and away from the first symmetrical portion. For example, the lower structure that forms the lower portion 202 may be formed. The lower structure may be formed using CNC, injection molding, casting, machining, or any other manufacturing process and may be formed of metal or plastic. As part of forming the lower structure, surfaces of the lower structure (e.g., the lower portion 202) may be metallicized (e.g., if the lower structure is formed of a non-conductive material). The input portion 112 may extend to an external surface of the lower structure when the lower structure is attached to the upper structure.

At step 806, the upper structure is mated with the lower structure to form the waveguide. For example, the upper structure may be mated to the lower structure to form the waveguide 106. The upper structure may be mated to the lower structure along the separation plane (e.g., on or parallel to the X-Y plane) without the use of solder or conductive adhesive. The upper structure may be glued/bonded (using a non-conductive adhesive), bolted, screwed (e.g., using one or more screws), snapped (e.g., using one or more snaps), welded, clamped using one or more clamps, press-fit, or any other assembly process known by those of ordinary skill in the art.

By forming the upper structure and lower structure to form the waveguide 106, leakage through the separation plane can be mitigated or eliminated. By doing so, solder or conductive adhesives are not necessary, thereby easing manufacturing and/or lowering costs associated with the waveguide 106.

EXAMPLES

Example 1: A waveguide comprising: an upper structure forming a first symmetrical portion of at least one channel that defines an energy path for electromagnetic energy to propagate between an input portion and a radiator portion of the channel; and a lower structure forming a second symmetrical portion of the channel that is aligned about a separation plane with the first symmetrical portion formed by the upper structure, wherein: the upper structure further forms the radiator portion to extend from the first symmetrical portion, orthogonal to the separation plane, and away from the second symmetrical portion; and the lower structure further forms the input portion to extend from the second symmetrical portion, orthogonal to the separation plane, and away from the first symmetrical portion.

Example 2: The waveguide of example 1, wherein: the first symmetrical portion comprises a first power divider portion; the second symmetrical portion comprises a second power divider portion; and the first power divider portion and the second power divider portion are configured to divide power between portions of the radiator portion.

Example 3: The waveguide of example 2, wherein the first power divider portion and the second power divider portion are configured to divide power parallel to the separation plane.

Example 4: The waveguide of example 3, wherein: the first symmetrical portion comprises a first feeder portion that extends parallel to the separation plane; and the second symmetrical portion comprises a second feeder portion that extends parallel to the separation plane.

Example 5: The waveguide of example 4, wherein the input portion is at a distal end of the second feeder portion.

Example 6: The waveguide of example 1, wherein the radiator portion comprises a plurality of radiators extending from respective portions of the first symmetrical portion.

Example 7: The waveguide of example 1, wherein the input portion comprises a rectangular waveguide.

Example 8: The waveguide of example 7, wherein the rectangular waveguide is a WR10 waveguide.

Example 9: The waveguide of example 7, wherein the input portion further comprises an iris between the rectangular waveguide and the second symmetrical portion.

Example 10: The waveguide of example 9, wherein the iris has a cross section that is smaller than the rectangular waveguide.

Example 11: The waveguide of example 1, wherein the upper structure and the lower structure are configured to mate without soldering or conductive bonding.

Example 12: The waveguide of example 11, wherein the upper structure and the lower structure are configured to mate using one or more of screws, snaps, press-fit, clamps, or non-conductive adhesive.

Example 13: The waveguide of example 1, wherein: the radiator portion extends to an external surface of the upper structure; and the input portion extends to an external surface of the lower structure.

Example 14: The waveguide of example 1, wherein the electromagnetic energy is radar energy.

Example 15: The waveguide of example 1, wherein the upper structure and the lower structure are injection molded.

Example 16: A method comprising: forming an upper structure of a waveguide that defines a first symmetrical portion of at least one channel for guiding electromagnetic energy between an input portion and a radiator portion of the channel; and forming a lower structure of the waveguide that defines a second symmetrical portion of the channel that is aligned about a separation plane with the first symmetrical portion formed by the upper structure; and mating the upper structure and the lower structure to form the waveguide, wherein: the upper structure further forms the radiator portion extending from the first symmetrical portion, orthogonal to the separation plane, and away from the second symmetrical portion; and the lower structure further forms the input portion extending from the second symmetrical portion, orthogonal to the separation plane, and away from the first symmetrical portion.

Example 17: The method of example 16, wherein the mating the upper structure and the lower structure does not utilize solder or a conductive adhesive.

Example 18: The method of example 17, wherein the mating the upper structure and the lower structure utilizes one or more of screws, snaps, press-fit, clamps, or non-conductive adhesive.

Example 19: The method of example 16, wherein the forming the upper structure and forming the lower structure utilizes injection molding.

Example 20: The method of example 16, wherein: the forming the first symmetrical portion comprises forming a first power divider portion; the forming the second symmetrical portion comprises forming a second power divider portion; and the first power divider portion and the second power divider portion are configured to divide power between portions of the radiator portion.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A waveguide comprising:

an upper structure forming a first symmetrical portion of at least one channel that defines a first energy path for electromagnetic energy to propagate between an input portion, a first feeder portion, and an upper symmetrical radiator portion of the channel; and a lower structure forming a second symmetrical portion of the channel that defines a second energy path for electromagnetic energy to propagate between a lower input portion, a second feeder portion, and a lower symmetrical radiator portion of the channel that is aligned about a separation plane with the first symmetrical portion formed by the upper structure, wherein:

the upper symmetrical radiator portion is a mirror image of the lower symmetrical radiator portion, the upper structure further forms the upper symmetrical radiator portion to extend from the first symmetrical portion, orthogonal to the separation plane, and away from the second symmetrical portion; and the lower structure further forms the input portion to extend from the second symmetrical portion, orthogonal to the separation plane, and away from the first symmetrical portion.

2. The waveguide of claim 1, wherein:

the first symmetrical portion comprises a first power divider portion;

the second symmetrical portion comprises a second power divider portion; and the first power divider portion and the second power divider portion are configured to divide power between portions of the upper symmetrical radiator portion.

3. The waveguide of claim 2, wherein the first power divider portion and the second power divider portion are configured to divide power parallel to the separation plane.

4. The waveguide of claim 3, wherein:

the first feeder portion that extends parallel to the separation plane and parallel to the first power divider portion; and the second feeder portion that extends parallel to the separation plane and parallel to the second power divider portion.

5. The waveguide of claim 4, wherein the input portion is at a distal end of the second feeder portion.

6. The waveguide of claim 1, wherein the upper symmetrical radiator portion comprises a plurality of radiators extending from respective portions of the first symmetrical portion.

7. The waveguide of claim 1, wherein the input portion comprises a rectangular waveguide.

8. The waveguide of claim 7, wherein the rectangular waveguide is a WR10 waveguide.

9. The waveguide of claim 7, wherein the input portion further comprises an iris between the rectangular waveguide and the second symmetrical portion.

10. The waveguide of claim 9, wherein the iris has a cross section that is smaller than the rectangular waveguide.

11. The waveguide of claim 1, wherein the upper structure and the lower structure are configured to mate without soldering or conductive bonding.

12. The waveguide of claim 11, wherein the upper structure and the lower structure are configured to mate using one or more of screws, snaps, press-fit, clamps, or non-conductive adhesive.

13. The waveguide of claim 1, wherein:

the upper symmetrical radiator portion extends to an external surface of the upper structure; and the input portion extends to an external surface of the lower structure.

14. The waveguide of claim 1, wherein the electromagnetic energy is radar energy.

15. The waveguide of claim 1, wherein the upper structure and the lower structure are injection molded.

16. A method comprising:

forming an upper structure of a waveguide that defines a first symmetrical portion of at least one channel for guiding electromagnetic energy between an input portion and an upper symmetrical radiator portion of the channel, the first symmetrical portion including a first feeder portion that extends substantially parallel to the upper symmetrical radiator portion;

forming a lower structure of the waveguide that defines a second symmetrical portion of the channel for guiding electromagnetic energy between a second feeder portion and a lower symmetrical radiator portion of the channel that is aligned about a separation plane with the first symmetrical portion formed by the upper structure; and mating the upper structure and the lower structure to form the waveguide, wherein:

the upper structure further forms the upper symmetrical radiator portion extending from the first symmetrical portion, orthogonal to the separation plane, and away from the second symmetrical portion; and the lower structure further forms the input portion extending from the second symmetrical portion, orthogonal to the separation plane, and away from the first symmetrical portion.

17. The method of claim 16, wherein the mating the upper structure and the lower structure does not utilize solder or a conductive adhesive.

18. The method of claim 17, wherein the mating the upper structure and the lower structure utilizes one or more of screws, snaps, press-fit, clamps, or non-conductive adhesive.

19. The method of claim 16, wherein the forming the upper structure and forming the lower structure utilizes injection molding.

20. The method of claim 16, wherein:

the forming the first symmetrical portion comprises forming a first power divider portion;

the forming the second symmetrical portion comprises forming a second power divider portion; and the first power divider portion and the second power divider portion are configured to divide power between portions of the upper symmetrical radiator portion.

* * * * *